United States Patent
Cao et al.

(10) Patent No.: US 9,861,074 B2
(45) Date of Patent: Jan. 9, 2018

(54) ANIMAL BATHING SYSTEM

(71) Applicant: Sunbeam Products, Inc., Boca Raton, FL (US)

(72) Inventors: John Cao, Boca Raton, FL (US); Christopher Figueira, Boca Raton, FL (US)

(73) Assignee: Sunbeam Products, Inc., Boca Raton, FL (US)

(*) Notice: Subject to any disclaimer, the term of this patent is extended or adjusted under 35 U.S.C. 154(b) by 171 days.

(21) Appl. No.: 14/753,485

(22) Filed: Jun. 29, 2015

(65) Prior Publication Data
US 2015/0373946 A1 Dec. 31, 2015

Related U.S. Application Data

(60) Provisional application No. 62/017,887, filed on Jun. 27, 2014.

(51) Int. Cl.
*A01K 29/00* (2006.01)
*A01K 13/00* (2006.01)

(52) U.S. Cl.
CPC .................. *A01K 13/001* (2013.01)

(58) Field of Classification Search
CPC .............. A01K 13/001; A01K 13/00
USPC ................. 222/144.5, 145.2, 145.1
See application file for complete search history.

(56) References Cited

U.S. PATENT DOCUMENTS

| | | | |
|---|---|---|---|
| 4,218,013 A | 8/1980 | Davison | |
| 6,455,017 B1 | 9/2002 | Kasting et al. | |
| 7,032,840 B2* | 4/2006 | Freidell | F04F 5/54 119/665 |
| 7,152,758 B2* | 12/2006 | Fazzio | A45D 34/02 222/145.1 |
| 7,237,279 B1 | 7/2007 | Berke | |
| 7,389,747 B2* | 6/2008 | Inahara | A01K 13/001 119/677 |
| 7,614,570 B2 | 11/2009 | Freidell | |
| 7,647,892 B2 | 1/2010 | Inahara et al. | |
| 8,596,498 B2* | 12/2013 | Werner | B05B 11/3083 222/132 |
| 2003/0024485 A1* | 2/2003 | Freidell | F04F 5/54 119/665 |
| 2012/0279990 A1* | 11/2012 | Werner | B05B 11/3083 222/132 |

* cited by examiner

*Primary Examiner* — Kristen C Hayes
(74) *Attorney, Agent, or Firm* — Seth Blum

(57) ABSTRACT

An animal bathing system is provided which mixes an injectant from a fluid container with water for bating an animal, where the injectant can be a shampoo conditioner, de-flea agent, or other similar type. The animal bathing system can include a support structure having a plurality of fluid containers each including an injectant and a fluid control system, wherein the plurality of fluid containers are in fluid communication with the fluid control system. The plurality of fluid containers can be supporting on the support structure in a vertical orientation. The fluid control system include a system for cleaning the component to prevent cross contamination without the need for back flushing.

11 Claims, 6 Drawing Sheets

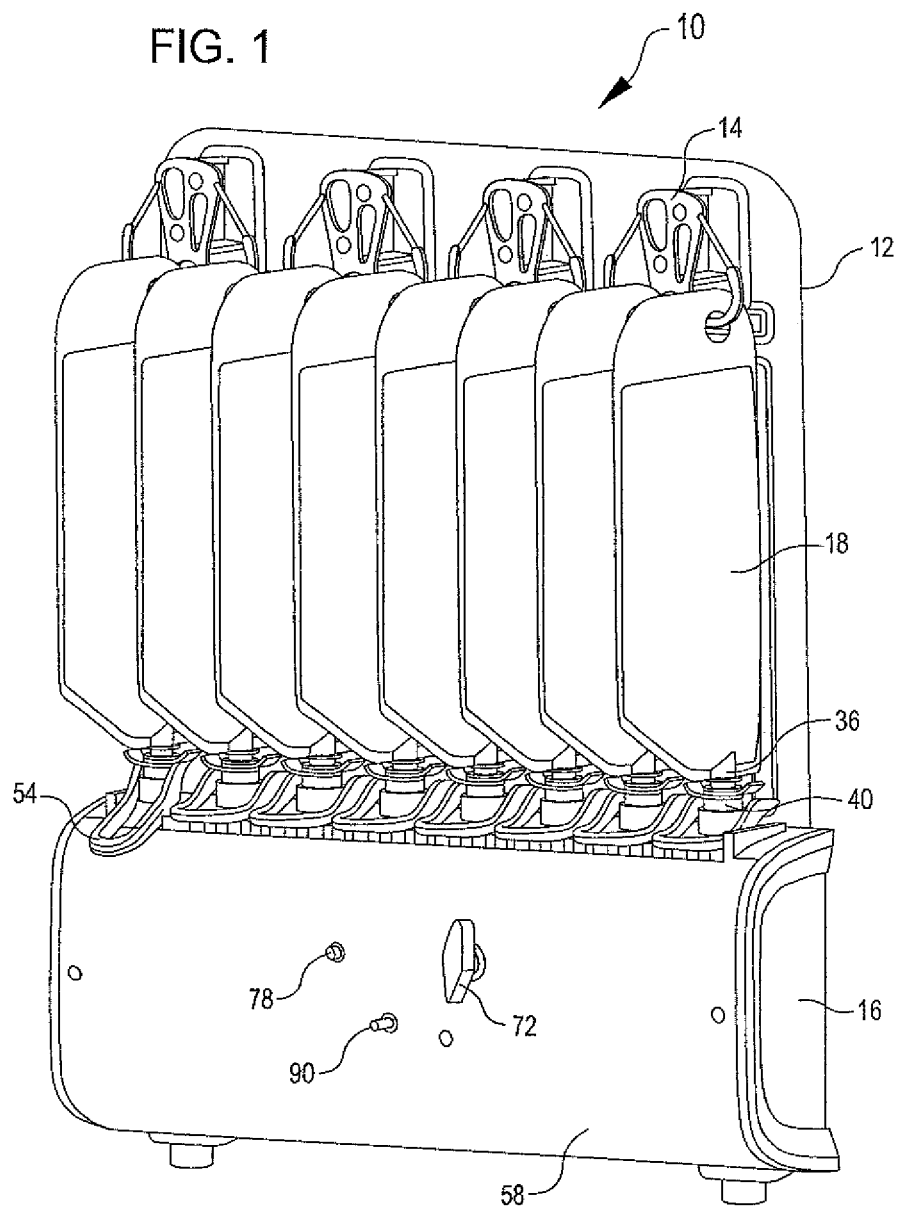

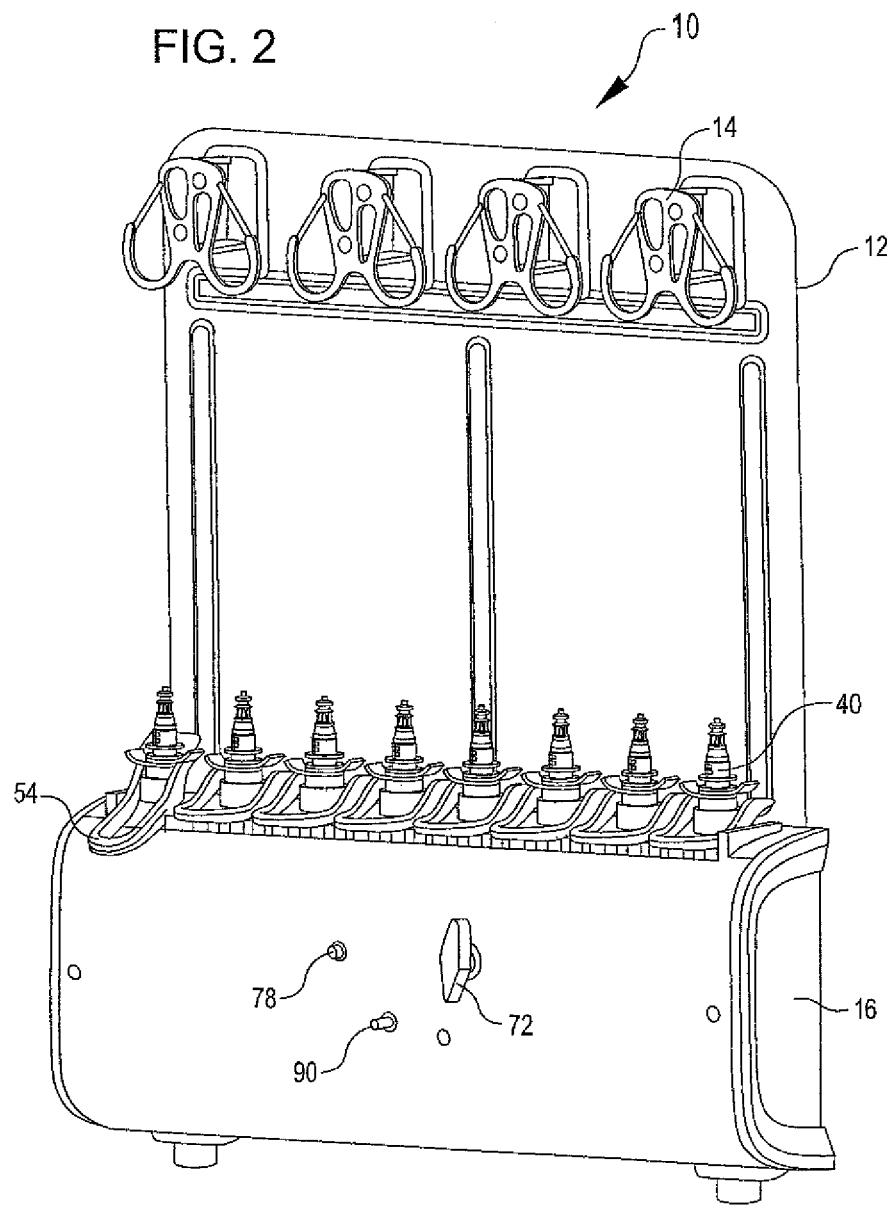

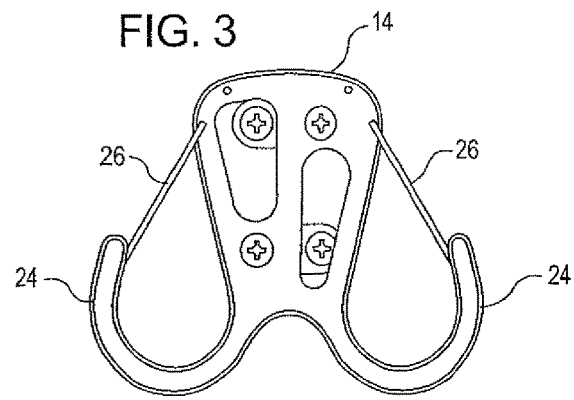
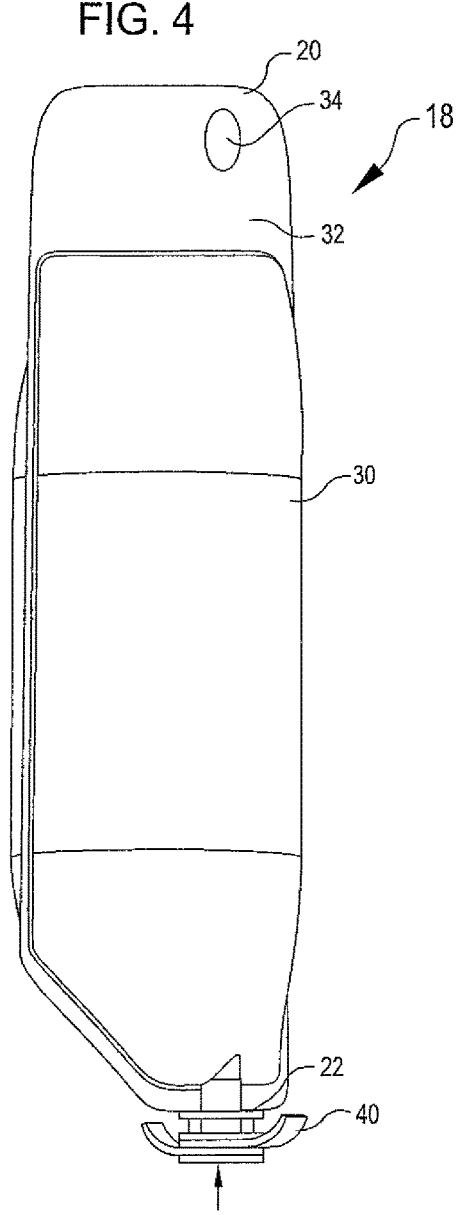
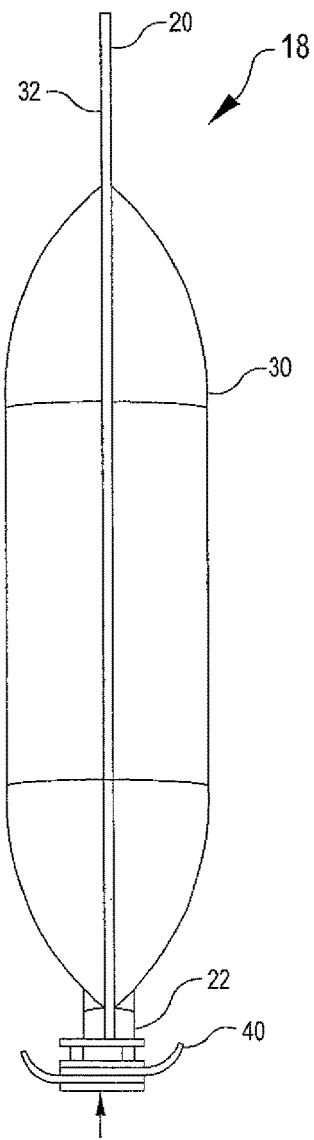

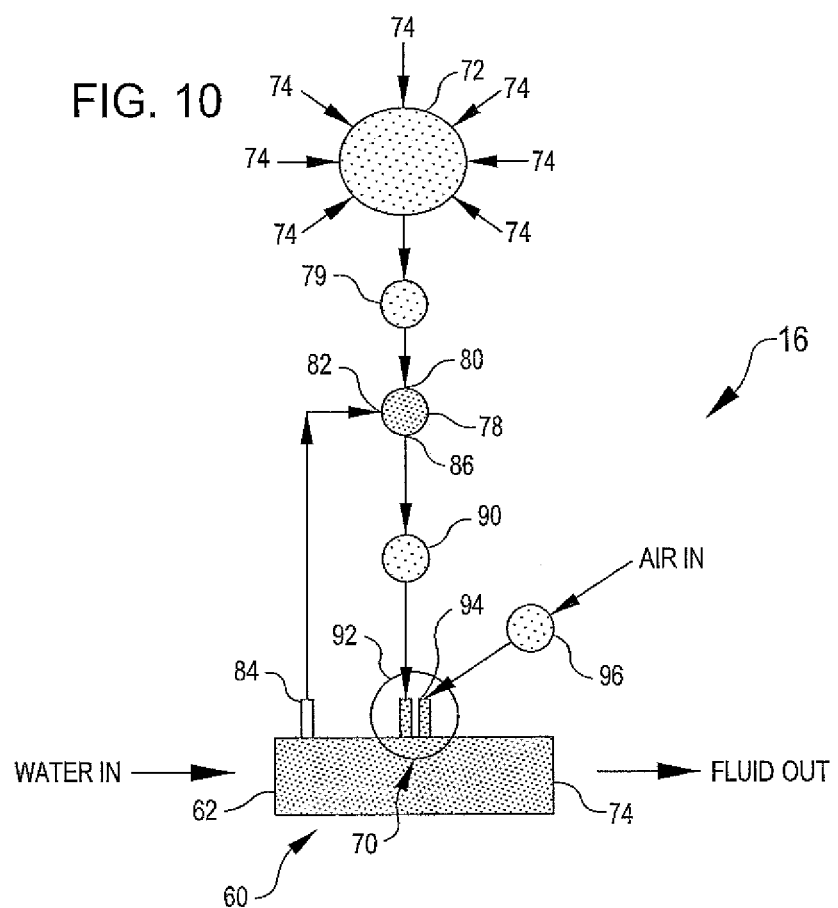

US 9,861,074 B2

ANIMAL BATHING SYSTEM

CROSS-REFERENCE TO RELATED APPLICATION

The present invention claims priority to U.S. Provisional Application No. 62/017,887 for ANIMAL BATHING SYSTEM, filed on Jun. 27, 2014, the contents of which is herein incorporated by reference in its entirety.

FIELD OF THE INVENTION

The invention relates generally to a bathing system, and, more particularly, to a system and method for bathing animals.

BACKGROUND OF THE INVENTION

Animals are conventionally washed by hand. This requires the application of water, cleaning and conditioning agents and is a highly labor intensive operation. The result is that hand washing is slow, laborious, and does not produce uniform results, since neither thorough washing nor thorough rinsing can be assured.

Several devices have been created to assist with animal washing. Some pre-existing devices utilize a plurality of bottles, each bottle connected to a control valve that allows shampoos flow from each bottle to be independently opened or closed. An industrial differential pressure injector of the Bernoulli type (often called a venturi or siphon mixer) can be used to create a vacuum upon various sources of shampoo and conditioner products so to draw from storage bottles and aggressively mix the products with the water inducing the vacuum. The resulting mixture is dispensed directly upon an animal to be bathed. An injector bypass valve allows rinse water to be dispensed.

SUMMARY OF THE INVENTION

The present invention provides an animal bathing system which mixes an injectant from a fluid container with water for bating an animal, where the injectant can be a shampoo conditioner, de-flea agent, or other similar type. The animal bathing system can include a support structure having a plurality of fluid containers each including an injectant and a fluid control system, wherein the plurality of fluid containers are in fluid communication with the fluid control system. The plurality of fluid containers can be supporting on the support structure in a vertical orientation.

The animal bathing system can further include a plurality on hanger elements mounted to the support structure, wherein one each of the plurality of fluid containers in hung in a vertical orientation from a corresponding hanger element.

Each of the plurality of fluid container can include a first fluid fitment and the fluid control system include a plurality second fluid fitments. The first and second fluid fitments are releasably connectable to each other to place the fluid container in fluid communication with the fluid control system. The second fluid fitment can include a separation mechanism, where the separation mechanism can be utilized to separate the first fluid fitment from the second fluid fitment.

The fluid control system includes a fluid distribution manifold having a main water inlet, a mixing unit, and a fluid outlet. A first selector valve including a plurality of fluid inlets; and a second selector valve actuatable between a bathing and rinsing position are connected to the mixing unit, wherein the second selector valve is connected in fluid communication between the mixing unit and the first selector valve. An adjustment valve can be connected in fluid communication between the second selector valve and the mixing unit.

The plurality of fluid containers is connected in fluid communication with one each of the plurality of fluid inlets on the first selector valve. In this manned, the first selector valve is actuatable to select a single fluid container.

The second selector valve includes a first input connected to the first selector valve, and second input connected to a water supply. When the second selector valve is in the bathing position the first input of the second selector valve is in an open position. When the second selector valve is in the rinsing position the first input of the second selector valve is in the closed position and the second input of the second selector valve is in an open position. In this manner, the fluid control system con be cleaned without the need for back flushing.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1 depicts a perspective view of an animal bathing system of the present disclosure;

FIG. 2 depicts the animal bathing system of FIG. 1 without the fluid containers;

FIG. 3 depicts an exemplary hanging element for use on the animal bathing system of the present disclosure;

FIG. 4 depicts a perspective view of an exemplary fluid container for use with the animal bathing system of the present disclosure;

FIG. 5 depicts a front view of the fluid container of FIG. 4;

FIG. 10 depict a schematic diagram of the fluid control system for use with the animal bathing system of the present disclosure.

DETAILED DESCRIPTION OF THE INVENTION

Figure 6:
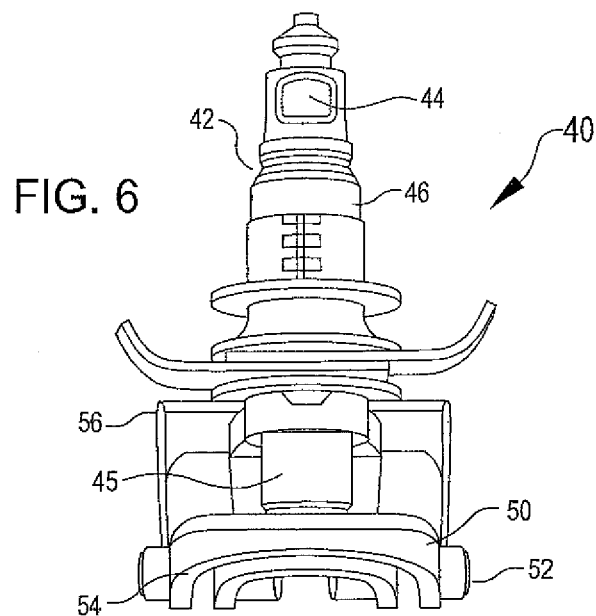
FIG. 6, depicts a front view a fluid fitment with an ejection element for use in the animal bathing system of the present disclosure.

Referring now to the drawing figures in which like reference designators refer to like elements, there is shown in FIGS. 1 and 2 the animal bathing system 10 of the present disclosure. The animal bathing system 10 provides an injectant to be mixed with water for bathing an animal, where the injectant can be a shampoo conditioner, de-flea agent, or other similar types.

The animal bathing system 10 includes a support structure 12 onto which the plurality hanger elements 14 and a fluid control system 16 are mounted. Fluid containers 18 can be supported from the hanger elements 14, where the fluid container 18 can be connected to and be in fluid communication with the fluid control system 16. The fluid container 18 can include a single injectant or combinations thereof.

In an embodiment, as shown in FIG. 3, the hanger elements 14 can take the form of a hook type hanger element 14 mounted to the support structure 12. The hook typed hanger elements 14 can each include at least one hook type hanger 24 having a resilient latch 26. Alternatively, the hook typed hanger elements 14 can each include pair of opposing hook type hangers 24, each having a resilient latch 26.

Referring to FIGS. 4 and 5, the fluid container 18 can include a pouch portion 30 for holding the shampoo/conditioner. A first end 20 of the fluid container 18 can include a hanger support portion 32 having a hanger receiver 34. The second end 22 of the fluid container 18 can include a first fluid fitment 36 for connection to the fluid control system 16. The fluid containers 18 are hung from the hanger element 14, by passing a hook type hanger 24 through the hanger receiver 34, where the resilient latch 26 prevents the fluid container 18 from unintentionally being removed from the hanger element 14.

The hook type hanger element 14 is only exemplary and other hanger elements 14 for supporting the fluid container 18 are also contemplated. For example, such hanging elements can include a clamping type hanging element, a horizontal support, or other know types.

The second end 22 of the fluid container 18 includes a first fluid fitment 36, which is releasably connectable to a second fluid fitment 40 on the fluid control system 16. The connection places the injectant in the pouch portion 30 of the fluid container 18 in fluid communication with the fluid control system 16. The fluid container 18 is hung in a vertical position to allow for gravity assistance is the removal of the injectant from the fluid container 18.

The fluid container 18 can be made of playable material, such that the pouch portion 30 can collapse as the injectant flows from the container. In this manner, there is no need to inject air into the pouch portion 30 as the injectant flows from therefrom.

Figure 7:
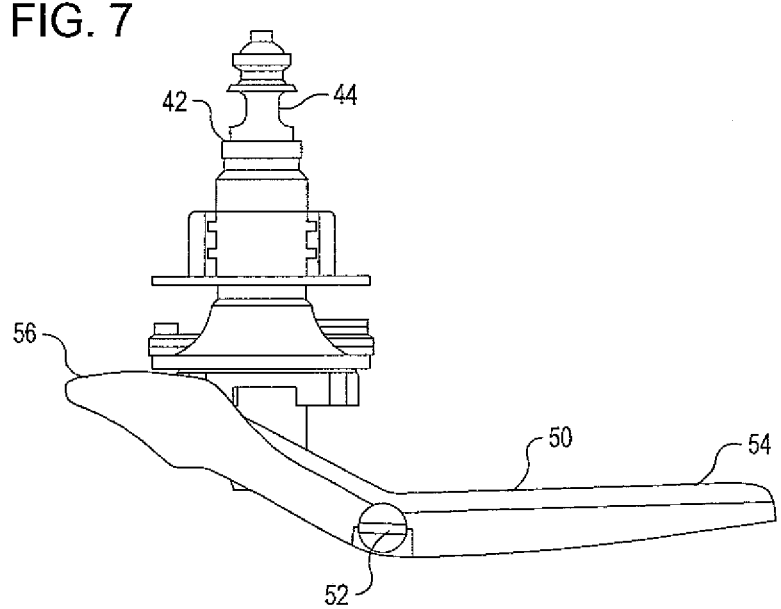
FIG. 7 depicts side view of the fluid fitment of FIG. 6.

Referring to FIGS. 6-7, the second fluid fitment 40 can include an insertion portion 42 positionable through the first fluid fitment 36. The first fluid fitment 36 can include a biased valve, biased in a closed position. The biased valve is opened through the positioning of the insertion position 42 there through, allowing the injectant to flow from the pouch portion 30 of the fluid container 18. The insertion portion 42 includes a fluid inlet 44 and fluid outlet 45, which place the pouch portion 30 in fluid communication with the fluid control system 16.

The second fluid fitment 40 can further include a sealing portion 46 about the insertion portion 42, which can form a compressive seal with an inner portion of the first fluid fitment 36. In order to separate the first and second fluid fitments 36 and 40, the second fluid fitment 40 can include an separation mechanism 50 pivotally connected to thereto. The separation mechanism 50 is pivotable about an axis 52, and includes a lever portion 54 on one side of the axis 52 and a cam portion 56 on the opposite side of the axis 52.

Figure 8:
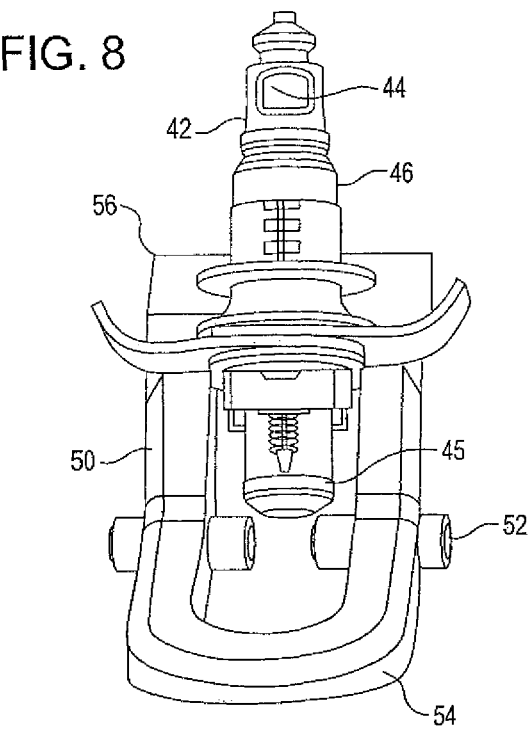
FIG. 8 depicts a front view of the fluid fitment of FIG. 6 with the ejection element in the ejection position.
Figure 9:
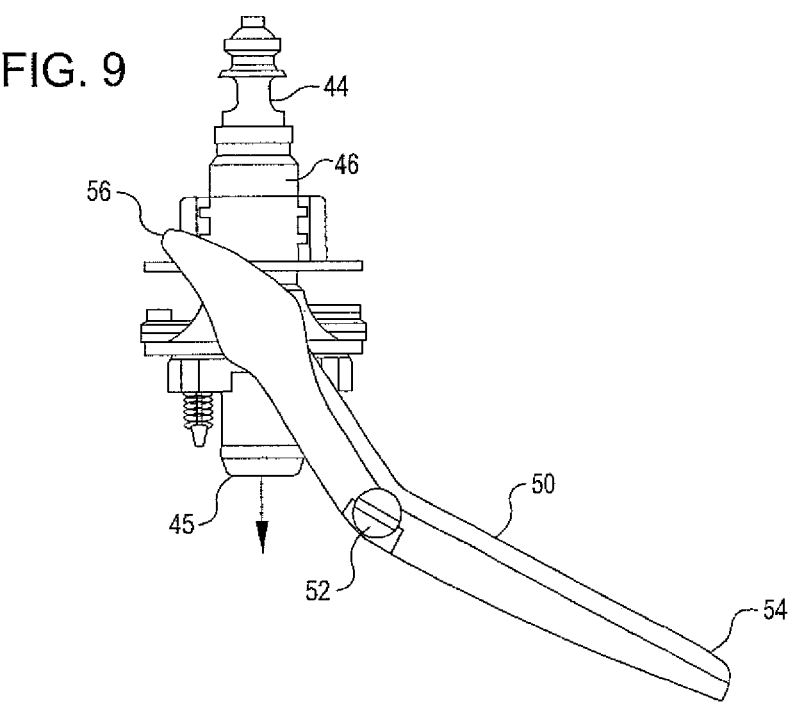
FIG. 9 depicts side view of the fluid fitment of FIG. 8.

Referring to FIGS. 8-9, to release the first fluid fitment 36, the lever portion 54 of the separation mechanism 50 is rotated about the axis 52 until the cam portion 56 engages the first fluid fitment 36. Sufficient force is applied to the lever position 54 such that the cam portion 56 lifts and separates the first fluid fitment 36 from the second fluid fitment 40.

Referring to FIGS. 1 and 10, the fluid control systems 16 includes a housing 58 having a distribution manifold 60 connected to a first, water inlet 62 for connection to a main water supply, and an outlet 64 from the housing is adapted for connection via a flexible hose or the like to an outlet spray head or nozzle (not illustrated). Interposed between the water supply line 62 and output line 66 is a mixing unit 70.

A first selector valve 72 is provided and included multiple fluid inputs 74 allowing for the individual connection to the plurality of fluid containers 18, where tubing can be used to connect the fluid outlet 45 of each of the second fluid fitments 40 to the individual fluid inputs 74 of the first selector valve 72. The first selector valve 72 further includes a fluid outlet 76 for dispensing the selected injectant. It is envisioned that that the first selector valve 72 can include any number of fluid inputs 74, include 2, 3, 4, 5, 6, 7, 8, 9, 10 . . . fluid inputs 74.

The first selector valve 72 is connected to a second selector valve 78, where the second selector valve 78 is actuatable between a first ("bathing") positing and a second ("rinsing") position. The second selector valve 78 includes a first fluid input 80 connected to the fluid outlet 76 of the first selector valve 72 and a second fluid input 82 connected to connected a water line 84. In this manner, when the second selector valve 78 is in the first position injectant is supplied through the second selector valve 78, and in the second position water is supplied through the second selector valve 78. A one way check valve 79, can be positioned between the first and second selector valves 72 and 78, prevent a fluid mixtures from back flowing into the first selector valve.

A fluid outlet 86 of the first selector valve 78 is connected to an adjustment valve 90, where the output of the adjustment valve 90 is connected to the mixing unit 70. The adjustment valve 90 allows for fine adjustment of the amount of injectant/water supplied to the mixing unit 70.

The mixing unit 70 is connected between the water supply line 62 and output line 66, and includes a fluid inlet 92 connected to the adjustment valve 90 and an air inlet 94. A one-way check valve 96 can be positioned on the air inlet 94 to prevent fluid from exiting the mixing unit 70 there through. The mixing unit 70 mixes the injectant/water with the water for the bathing or rinsing of the animal.

The mixing unit 70 can take the form of a venturi unit 100 which can mix combinations of water, air, and the selected injectant into a fluid stream exiting through the output line 66 for the bathing of the animal. An exemplary venturi unit 100 is provided in U.S. Pat. No. 6,23,294 entitled Method and Apparatus for Fluid Mixing and Dispensing, the contents of which is incorporated by references in its entirety.

In a method of operation, to bath an animal, the first selector valve 72 is used to selects the injectant to be used, i.e., shampoo, conditioner, etc. The second select valve 78 is placed in the first ("bathing") position. Water is supplied to water inlet 62 and flows through the mixing unit 70. In a venture type mixing unit 100, the lower pressure at the constricted throat portion of the venturi passageway will increase velocity of the water flowing through it, and also create suction to draw air into passageway and to draw the selected injectant into the venturi unit 100. The suction can sufficient to draw the injectant from the fluid container 18 into the mixing unit.

The water will be mixed with the injectant at fluid inlet 92, and a separate stream of water will be mixed with air at air inlet 94, forming air bubbles and soap bubbles in the separate streams. The two streams will mix together after the outlet end 64 of the mixing unit 70, and will be dispensed through the outlet. The amount injectant provided to the mixing unit 70 can be adjusted using the adjustment valve 90.

To rinse the animal, the second selector valve 78 is toggled to the second ("rinse") position. In the second position only water is dispensed to the mixing unit 70, and a water spray is output to rinse the animal. In addition to rinsing the animal, the second ("rinsing") position of the second selector valve 78 allows for the cleaning of the adjustment vale 90, mixing unit 70, and connecting lines to prevent cross contamination of injectant without the need of back flushing.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An animal bathing system comprising:
a support structure;
a plurality of fluid containers each including an injectant;
a plurality of hanger elements mounted to the support structure, wherein one each of the plurality of fluid containers in hung in a vertical orientation from a corresponding hanger element;
a fluid control system, wherein the plurality of fluid containers are in fluid communication with the fluid control system.

2. An animal bathing system as set forth in claim 1, wherein each of the plurality of fluid container includes a first fluid fitment and the fluid control system include a plurality second fluid fitments, wherein the first and second fluid fitments are releasably connectable to place the fluid containers in fluid communication with the fluid control system.

3. An animal bathing system as set forth in claim 2, wherein the second fluid fitment include a separation mechanism.

4. An animal bathing system comprising:
a support structure;
a plurality of fluid containers each including an injectant;
a fluid control system, wherein the plurality of fluid containers are in fluid communication with the fluid control system,
wherein the fluid control system comprises:
a fluid distribution manifold including a main water inlet, a mixing unit, and a fluid outlet;
a first selector valve including a plurality of fluid inlets; and
a second selector valve actuatable between a bathing position and a rinsing position,
wherein the second selector valve is connected in fluid communication between the mixing unit and the first selector valve.

5. An animal bathing system as set forth in claim 4, wherein each of the plurality of fluid containers is connected in fluid communication with one each of the plurality of fluid inlets on the first selector valve.

6. An animal bathing system as set forth in claim 5, wherein the first selector valve is actuatable to select a single fluid container.

7. An animal bathing system as set forth in claim 5, wherein the second selector valve includes a first input connected to the first selector valve, and second input connected to a water supply.

8. An animal bathing system as set forth in claim 7, wherein in the bathing position the first input of the second selector valve is in an open position, and is the rinsing position the first input of the second selector valve is in a closed position and the second input of the second selector valve is in an open position.

9. An animal bathing system as set forth in claim 4, further comprising an adjustment valve connected in fluid communication between the second selector valve and the mixing unit.

10. An animal bathing system as set forth in claim 4, further including a means for cleaning the fluid control system.

11. An animal bathing system as set forth in claim 10, wherein the means for cleaning precludes the need to back flush the fluid control system.

* * * * *